Patented Sept. 5, 1944

2,357,550

UNITED STATES PATENT OFFICE 2,357,550

INSULATOR

Davidge H. Rowland and Carl D. Croskey, Baltimore, Md., assignors to Locke Insulator Corporation, Baltimore, Md., a corporation of Maryland No Drawing. Application June 16, 1941, Serial No. 398,362

2 Claims. (Cl. 117—70)

This invention relates to insulators and more particularly to a method of forming thereon a glaze to which a metal coating may be directly applied to thereby facilitate a solder connection between the metal coated part of the insulator and a cooperating metallic part.

The principal object of the invention is to provide, in connection with a ceramic insulator body, a glaze having a coefficient of expansion less than the coefficient of expansion of the insulator, said glaze including certain ingredients, at least one of which may be chemically treated to form in the glaze minute crater-like openings which are unaffected by the subsequent firing of the insulator.

Another object of the invention is to provide, in connection with a ceramic insulator having a coefficient of expansion in the nature of $5.8 \times 10^{-6}$ per degree centigrade, a glaze having a coefficient of expansion not greater than $4.8 \times 10^{-6}$ per degree centigrade, said glaze containing approximately five percent (5%) of finely divided insoluble carbonates such as calcium carbonate, said glaze having a fusing point slightly higher than the temperature at which the insulator body is fired.

Still another object of the invention is to provide a glaze for use with insulators having a coefficient of expansion of approximately $5.8 \times 10^{-6}$ per degree centigrade, said glaze having a coefficient of expansion per degree centigrade materially less than the coefficient of expansion of the insulator body, said glaze containing a small percentage of insoluble calcium carbonate, said glaze, after being applied to the insulator body and allowed to dry, being subjected to the action of an acid, such for example, as hydrochloric acid, so as to cause a reaction between the acid and the calcium carbonate to form in the glaze body a plurality of crater-like openings which remain unaffected during the firing of the insulator.

Other objects of the invention will be noted from the detailed description thereof as hereinafter set forth.

In the prior application of Davidge H. Rowland, filed April 27, 1938, Serial No. 204,613, now Patent No. 2,264,152, dated November 25, 1941, there is described a method of producing, during the firing step, in a glaze coating for ceramic insulators a plurality of undercut craters, and we have further described in our Patent No. 2,230,205, dated January 28, 1941, a method by which insulators so formed may have applied to portions of the glazed surface a metallic coating to which the solder, used to connect a ceramic insulator to a metallic element, may be bonded.

Our present invention relates to a new and improved method of forming a plurality of undercut craters in a glazed surface prior to the firing stage of the glazed insulator body, said craters being unaffected by the firing stage. It has been found that where craters are formed, as described in the copending application of Rowland, supra, the glazed body suitable for such reaction has a coefficient of expansion equal to or greater than the coefficient of expansion of the ceramic insulator body, and consequently the glaze does not coact with the insulator body on the cooling to materially increase the strength of the insulator body.

We have found that where a mixture of ball clay and calcium carbonate substantially in the proportions of 95% ball clay and 5% calcium carbonate, if dissolved in water so as to bring the mixture to a density of approximately 1.3 and a Baumé of approximately thirty degrees (30°), said mixture can be applied as a glaze to the surface of an insulator either by dipping or spraying as desired and the glaze so formed will have a coefficient of expansion of approximately $3.9 \times 10^{-6}$ per degree centigrade. Such a glaze will not craze during the firing of an insulator to which it is applied even though the insulator body should have a coefficient of expansion of $5.8 \times 10^{-6}$ per degree centigrade, and such glaze, by reason of its low coefficient of expansion, materially increases the strength of the insulator unit to withstand shocks and strains.

In order to secure to the glazed surface of an insulator an appreciable metallic coating to which solder can bond when the insulator body is connected to the co-acting metallic element, it has been the practice in the past to mix with the liquid glaze a metallic powder or to apply a metallic coating to the glaze, fire the insulator, and continue this operation until a metallic coating of appreciable thickness is formed, or to form in the glaze, as a result of the firing, minute craters, as is set forth in the Rowland co-pending application Ser. No. 204,613, supra. All of these steps or processes have involved a large increase in the cost of the finished insulator and since in every case the coefficient of expansion of the glaze per degree centigrade has been equal to or greater than the coefficient of expansion of the insulator per degree centigrade, the metallized coating so applied, in combination with the glazes heretofore utilized, have resulted in a decrease in the strength of the insulator unit to a very appreciable degree.

We have found, however, that by utilizing a glaze compounded as above set forth we have been able to produce a glaze which greatly strengthens the insulator unit and we have formed a glaze which may be treated prior to the firing of the insulator so as to form therein a plurality of microscopic undercut craters. To accomplish this end, after the insulator body has been either dipped or sprayed with the improved glaze and the latter allowed to dry, we apply to selected portions of the unfired glazed surface, either by brushing or spraying a dilute hydrochloric acid solution. The acid immediately reacts with the calcium carbonate contained in the glaze, that is, it immediately attacks the carbonate particles, creating carbon dioxide and produces in the surface of the glaze small or microscopic undercut craters. After the reaction has ceased the insulator may be fired and, owing to the fact that the fluxing temperature of the glaze is slightly higher than the fusing point of the body material, the craters maintain their shape and are not affected during the firing and cooling cycle of the insulator. The small or microscopic craters thus produced by the chemical action between the hydrochloric acid solution and the particles of calcium carbonate afford ideal anchoring points for the metal spray when the same is subsequently applied to the treated portions of the surface glaze. The formation of these small craters at selected points in the glazed surface does not, we have found, in any way detrimentally affect the strength of the insulator unit nor the continuity of the glazed surface. By this means a mat glaze can be created in a glazed surface having an exceedingly low coefficient of expansion and the subsequent spraying of the metal on the surface does not, it is found, tend to weaken the bond between the glaze and the insulator body or to cause the glaze to crack or craze.

We are thus enabled to apply by the spray method a coating of sufficient thickness thoroughly bonding to the insulator to which metal parts, by means of solder, may be readily and inexpensively connected to form an insulator assembly.

We may utilize, if desired, after the metallic spray has been applied, the method described in our Patent No. 2,230,205, supra, although it is to be understood that other methods of assembly may be used if desired.

Having thus described our invention, what we claim and desire to secure by Letters Patent, is:

1. The method of forming a metallized surface on ceramic bodies which comprises applying to the ceramic body, prior to firing the same, a glaze composition having a coefficient of expansion in the nature of $4.0 \times 10^{-6}$ per degree centigrade, said glaze composition incorporating between 5% and 8% calcium carbonate by weight, allowing the glaze to dry, applying to a selected portion of said glaze a dilute solution of hydrochloric acid to form in said glaze surface a plurality of undercut craters, subsequently firing said coated ceramic body, and finally applying to said treated portion a metallic coating by the spray method.

2. The method of forming a metallized surface on a ceramic body which comprises applying to the ceramic body, prior to firing, a coating composition having a coefficient of expansion less than the coefficient of expansion of the insulator body per degree centigrade, said composition including approximately 5%, by weight, of calcium carbonate, allowing said coating composition to dry, subjecting a selected portion of said coating composition to the action of dilute hydrochloric acid to form therein a series of microscopic craters, subsequently firing said coated ceramic body, and finally applying a metallized coating to the treated portion of said coating composition by the spray method.

DAVIDGE H. ROWLAND.
CARL D. CROSKEY.